United States Patent [19]

Koppe et al.

[11] 4,211,653
[45] Jul. 8, 1980

[54] METHOD FOR VACUUM FILTRATION

[75] Inventors: Eberhard Koppe, Johannesburg, South Africa; Peter Schonteich, Cologne; Wolfgang Epper, Bergheim-Zieverich, both of Fed. Rep. of Germany

[73] Assignee: Klockner-Humboldt-Deutz Aktiengesellschaft, Fed. Rep. of Germany

[21] Appl. No.: 27,470

[22] Filed: Apr. 5, 1979

[30] Foreign Application Priority Data

Apr. 7, 1978 [ZA] South Africa ................... 78/1999
Aug. 17, 1978 [DE] Fed. Rep. of Germany ....... 2835967

[51] Int. Cl.$^2$ ............................................. B01D 33/10
[52] U.S. Cl. ...................................... 210/77; 162/330
[58] Field of Search .................. 210/77, 86, 97, 104, 210/111, 115, 116, 161, 402, 403, 416 R; 162/323, 330, 357, 335

[56] References Cited

FOREIGN PATENT DOCUMENTS 2461663 12/1973 Fed. Rep. of Germany ........... 210/403
333228 of 1903 France .................................... 162/335

*Primary Examiner*—Frank Sever
*Attorney, Agent, or Firm*—Hill, Van Santen, Steadman, Chiara & Simpson

[57] ABSTRACT

A rotary vacuum filter for the separation of solids-liquid mixtures has a rotatably supported filter drum having a stationary hollow conduit extending through the interior of the drum which is attached to a vacuum pump. The drum is rotated in a tank containing a mixture to be separated, so that the vacuum action draws the mixture through a filter disposed on the surface of the drum into the interior thereof, where an interior pump removes the filtered liquid and discharges same through the hollow conduit. At no time during the filtration process is air mixed with the filtered liquid, so that subsequent processing to remove air from the liquid is not required.

4 Claims, 2 Drawing Figures

METHOD FOR VACUUM FILTRATION

BACKGROUND OF THE INVENTION

This invention relates to a cell-less vacuum rotary filter for the separation of solids-liquid mixtures.

Cell-less vacuum rotary filters known in the art utilize a suction pump disposed outside of the vacuum-rotary filter to suck filtrate out of the rotating filter drum. In such configurations it is unavoidable that air will be sucked out of the filter drum with the filtrate and mixed therewith. Furthermore, because the suction force of the suction pump must be substantially greater than the vacuum existing in the filter drum, economical operation can only be obtained utilizing a relatively low vacuum pressure, which limits the volume of material which can be handled in a given time.

Certain liquids requiring filtration, such as fruit juices and wine, can not be stored directly upon discharge from conventional vacuum rotary filters because the air mixed therewith by such filters is harmful to the liquids. Storage of such liquids for extended periods without removal of the air mixed therewith results in oxidation, which appreciably diminshes not only the quality of the recovered liquid, but also impairs the stability of the liquid. Accordingly, liquids discharged from conventional rotary vacuum filters must be additionally processed to remove the air.

In accordance with the principles of the present invention, a rotary vacuum filter is provided with a suction pump disposed in the interior of a rotating filter drum so that no air is mixed with the discharged filtered liquid, making additional processing unnecessary.

The invention consists of a hollow rotating filter drum rotatably supported in a tank containing a liquid to be filtered. The drum has a hollow conduit coaxially extending through it, said conduit having a port connecting the interior of the drum to a vacuum pump. A vacuum thus created inside the drum draws liquid from the tank through a filter disposed on the surface of the drum into the interior of the drum.

A suction pump is also mounted to the hollow conduit in the interior of the drum and has a suction head which extends into the filtered liquid for removal thereof without mixing the liquid with air. The removed filtered liquid is discharged through a pipe also extending through the hollow conduit.

A liquid-level measuring device is provided in the interior of the drum to ensure that a liquid-level is maintained inside the drum so that the suction head of the suction pump will always be beneath the liquid-level.

It is accordingly an object of the present invention to provide a cell-less rotary vacuum filter which separates solids-liquid mixtures without mixing the filtered liquid with air. Another object of the present invention is to provide a cell-less rotary vacuum filter which is operable at high vacuum pressures so that a large quantity of liquid may be filtered in a given period of time.

A further object of the present invention is to provide a means for maintaining a constant liquid-level inside a filtered drum in a rotary vacuum filter to ensure that a suction pump in the filter drum is constantly maintained below a liquid-level.

Further details, features and advantages of the present invention will be apparent from the following explanation of the invention and the accompanying drawings.

DESCRIPTION OF THE PREFERRED EMBODIMENTS

Figure 1:
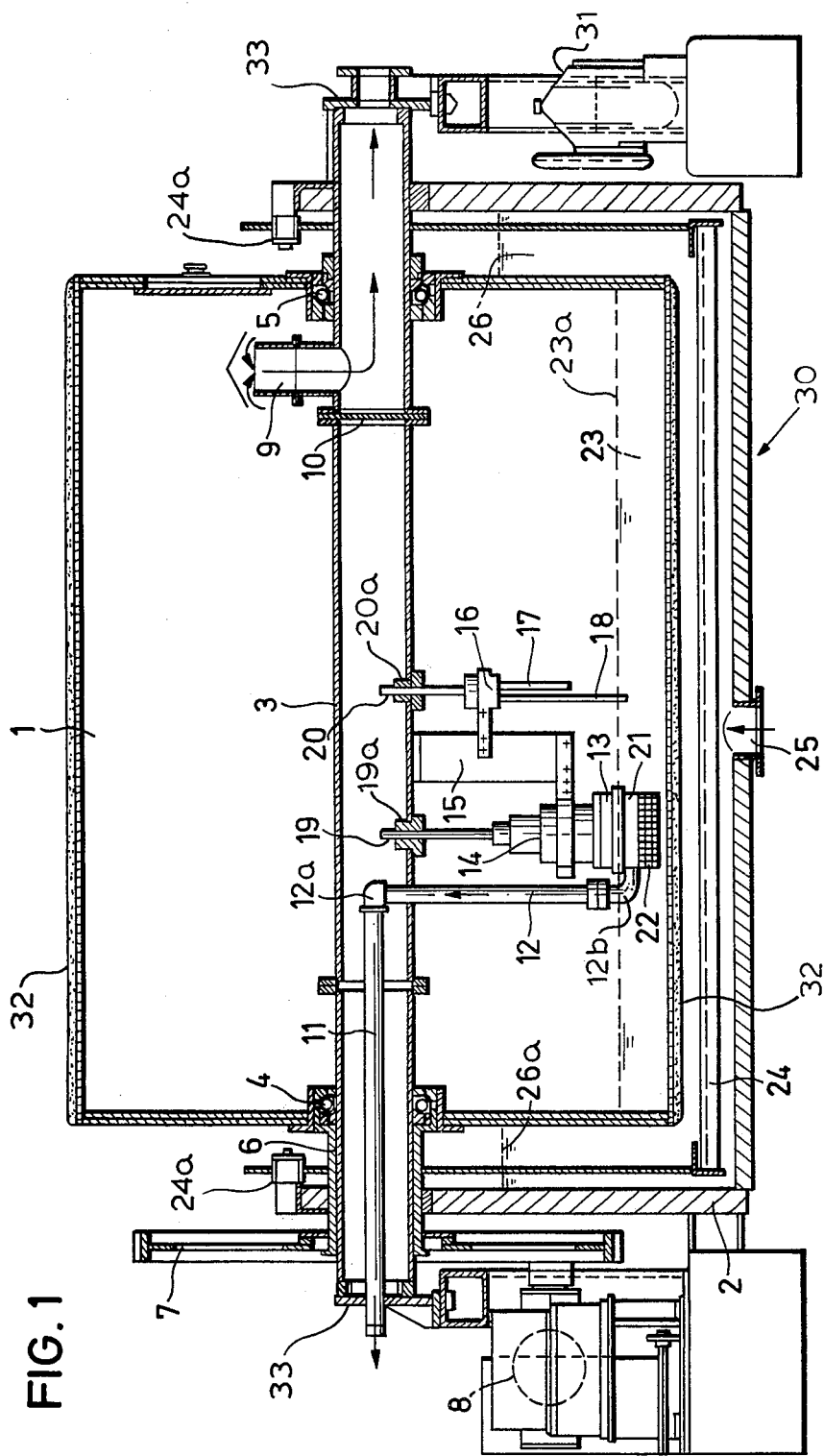
FIG. 1 shows a longitudinal cross-section of a cell-less vacuum rotary filter apparatus according to the present invention.

A cell-less vacuum rotary filter apparatus is shown at 30 in FIG. 1. The apparatus 30 has a filter drum 1 which is supported in a tank 2. A hollow conduit 3, extending coaxially through the interior of the filter drum 1, is immovably supported above the tank 2 by supporting members 33. The filter drum 1 and the conduit 3 are connected in air tight relation, however, the filter drum 1 is rotatable with respect to the stationary conduit 3 by means of bearings 4 and 5 disposed at opposite ends of the filter drum 1.

The filter drum 1 is rotated by means of a drive gear 7 connected to a drum motor 8, including a conventional intermediary drive connection not shown in greater detail.

One end of the hollow conduit 3 has a port 9 connecting the interior of the filter drum 1 with an interior of the conduit 3. The interior of the conduit 3 is connected to a vacuum pump 31, so that action of the vacuum pump 31 will produce a vacuum inside the filter drum 1. A sealing disc 10 in the conduit 3 is disposed adjacent the port 9 to prevent a vacuum from resulting in the remainder of the conduit 3.

A suction pump 13 is mounted on a bracket 15 connected to the conduit 3 and is powered by a motor 14. The pump 13 has a filtrate receiving port 21 with a mesh filter head 22. The filter port 21 is connected to an elbow pipe 12b, which in turn is connected to a conduit 12. The conduit 12 is connected by a second elbow joint 12a to a conduit 11 which is disposed coaxially inside the stationary conduit 3. The conduit 11 communicates with a discharge tank (not shown) for the deposit of discharged filtered liquid.

Figure 2:
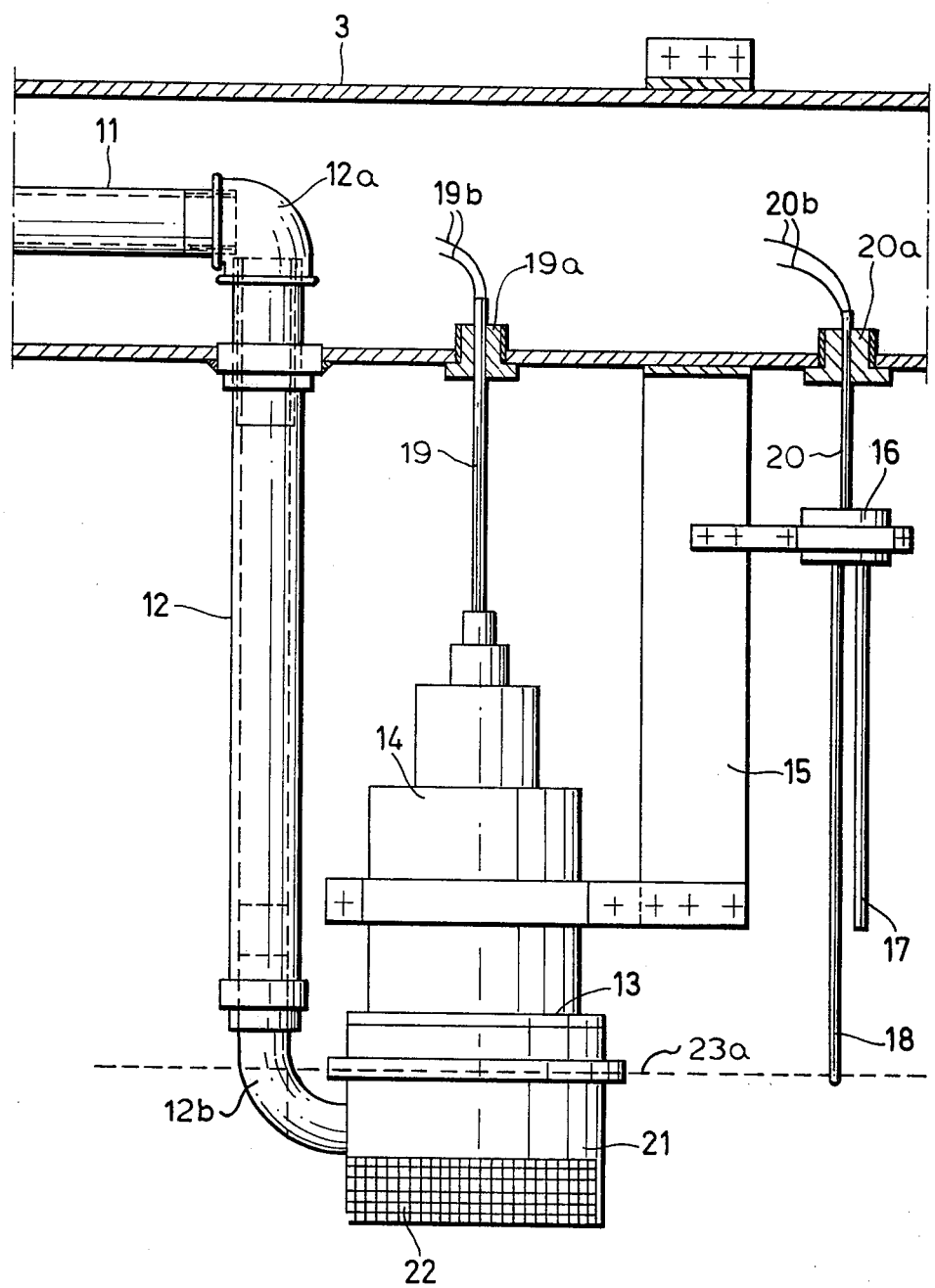
FIG. 2 shows an enlarged detail the arrangement of a suction pump in the interior of a filter drum shown in FIG. 1.

As shown in greater detail in FIG. 2, a conduit 19 sealingly enters the interior of the conduit 3 through a grommet 19a, so that leads 19b for operation of the pump 14 can extend therethrough and be connected to a power source (not shown). Also connected to the bracket 15 is a measuring device 16 having a contact measuring probe 17, and a second contact measuring probe 18 which is longer than the probe 17. The measuring device 16 has a conduit 20 which is sealingly engaged by means of a grommet 20a with the conduit 3 through which leads 20b extend and can be connected to suitable control means (not shown).

An agitation element 24 is rotatable about bearings 24a, and is rotated by the drive motor 8 at a selected speed which may be varied with respect to the rotation speed of the filter drum 1 by means of the intermediate drive (not shown in greater detail).

Operation of the apparatus shown in FIGS. 1 and 2 is as follows. A liquid 26 to be filtered is entered into the tank 2 through an entry port 25. The liquid 26 is maintained approximately at a liquid level 26a. Operation of the vacuum pump 31 creates a vacuum inside of the filtered frum 1 so that the liquid 26 is drawn into the filtered drum 1 through a filter 32 disposed on the surface of the filter drum 1.

Filtered liquid 23 inside the filter drum 1 is maintained at a level in the range designated approximately by 23a by means of the measuring device 16. If the liquid 23 falls below the level 23a, and thus moves out of contact with the probe 18, the control device 16 will signal for the pump 13 to cease operation. This may be accomplished either by an automatic feedback control, or be actuation of a visual or audio alarm to alert an operator to manually stop the operation of the pump 13.

If the liquid level 23a reaches the bottom of the probe 17, a relay (not shown) increases the speed of operation of the pump 13 so that a greater quantity of liquid 23 is removed through the conduits 12 and 11. As was the case with the probe 18, the measuring device 16 may alternatively activate an alarm to signify to an operator that the pump 13 should be increased in operating speed.

In this manner, the filtrate receiving port 21 and the filter head 22 are constantly maintained below the liquid level 23a, so that only liquid 23 is sucked into the pump 13, and no mixture of the liquid 23 with air occurs.

Rotation of the agitation element 24 at a selected speed ensures uniform distribution of solids in the mixture 26 so that the filter 32 experiences an uniform load. The rotational speed of the agitator element 24 may be varied to adapt to the filtering needs of different solids-liquid mixtures.

Removal of solids deposited on the exterior of the filter 32 is accomplished by conventional scrapers (not shown). Damage to the filter 32 may be avoided by allowing a predetermined residual layer of deposits to remain on the surface of the filter 32.

Although various modifications and changes may be suggested by those skilled in the art, it is the intention of the inventors to embody within the patent warranted hereon all such changes and modifications as reasonably and properly come within the scope of their contribution to the art.

We claim as our invention:

1. A method for the separation of solids-liquid mixtures which are subject to oxidation which mixed with air, comprising the steps of:
    supporting a filter drum having a filter in a tank containing a mixture to be separated;
    providing a fixed suction pump within said drum;
    rotating said filter drum;
    creating a vacuum inside said filter drum to draw said mixture through said filter means to and interior of said drum;
    rotating said filter drum;
    operating said suction pump having a suction head to suck filtrate from the interior of said drum;
    maintaining a filtrate level inside said filter drum such that said suction head is constantly disposed beneath said filtrate level so as to prevent the mixing of said filtrate with air; and
    discharing said filtrate from said interior of said filter drum.

2. The method of claim 1 including the additional step of moving an agitator element through said mixture to be separated to evenly distribute solids therein.

3. A method for the separation of a solids-liquid mixture which is subject to oxidation when mixed with air, comprising the steps of:
    placing a mixture to be separated in a tank;
    supporting a filter drum carrying a filter means on a surface thereof above said tank such that said filter drum extends partially into said mixture;
    providing a fixed suction pump within said drum;
    rotating said drum;
    creating a vacuum inside said filter drum to draw said mixture through said filter means into an interior of said drum;
    operating said suction pump inside said filter drum to remove filtrate from the filter drum;
    immersing a suction head of said suction pump completely beneath a filtrate level;
    ceasing operation of said suction pump if said filtrate level drops to a level such that a portion of said suction head is not immersed in said filtrate, and
    increasing operation of said suction pump when said filtrate level exceeds a prescribed level so as to prevent the mixture of said filtrate with air; and
    transmitting filtrate from said suction pump to an exterior of said filter drum.

4. The method of claim 3 including the additional step of moving an agitator element through said mixture to be separated to evenly distribute solids therein.

* * * * *